UNITED STATES PATENT OFFICE.

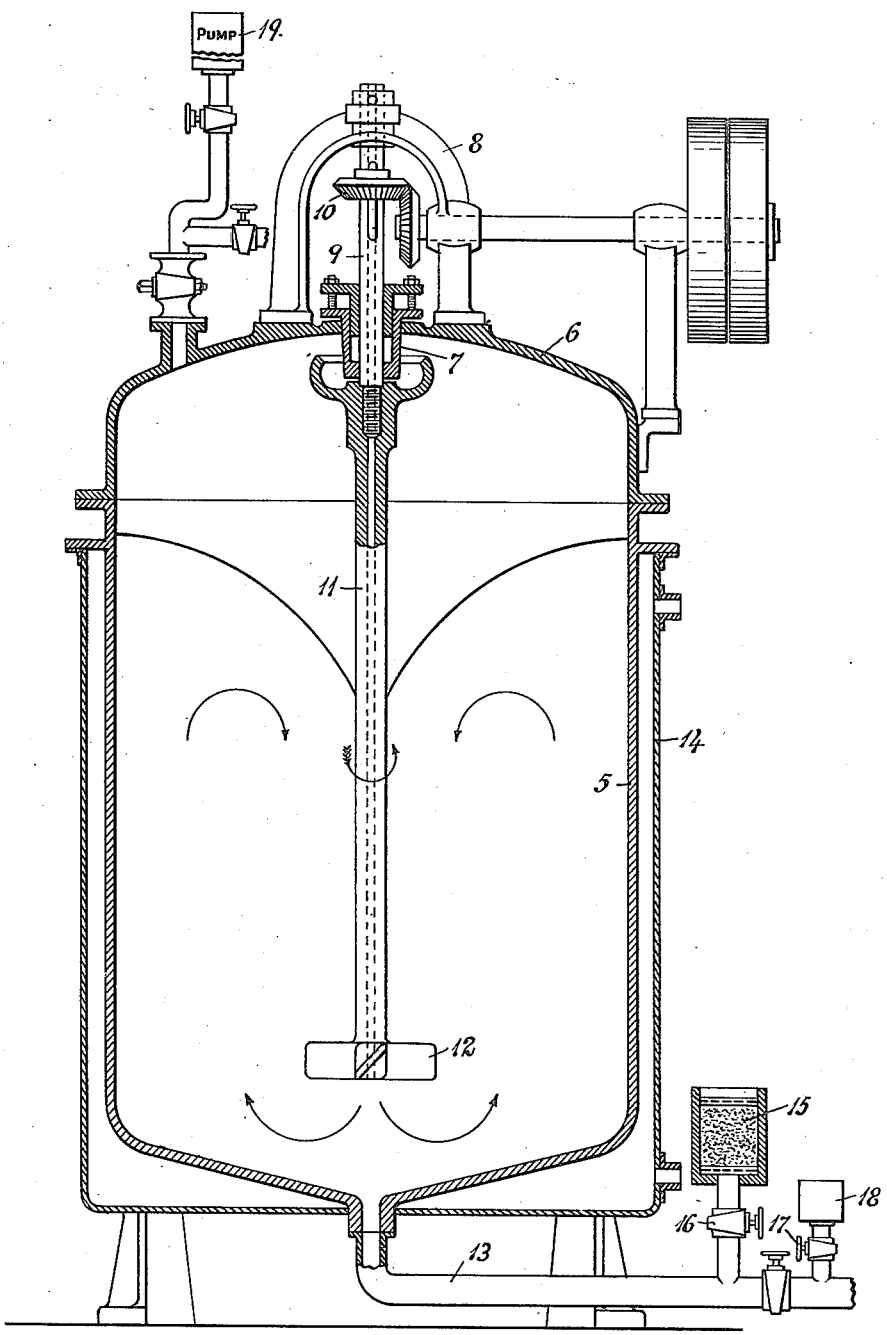

LEOPOLD NATHAN, OF ZURICH, SWITZERLAND.

ART OF BREWING BEER.

1,280,280.  Specification of Letters Patent.  Patented Oct. 1, 1918.

Application filed December 26, 1913. Serial No. 808,787.

*To all whom it may concern:*

Be it known that I, LEOPOLD NATHAN, a citizen of the German Empire, and a resident of Zurich, Switzerland, have invented a new and useful Improvement in the Art of Brewing Beer, of which the following is a specification.

This invention relates to an improved process for preparing beer and has for one of its objects the preparation of a beer which is substantially free from free oxygen or air.

I have found that with certain kinds of beer especially those rich in the extract of hops, the amount of air necessary to permit proper fermentation is a great deal less even than I believed it to be when I filed my application which became United States Letters Patent No. 915,791 of March 23, 1909.

My invention may be carried out in various apparatus and appliances for example as shown in the accompanying drawing representing a sectional elevation thereof as described in the Patent No. 899,756 issued to Hans Bolze and myself. The vessel 5 has a cover 6 for closing it hermetically, and the inner walls should be devoid of projections to facilitate cleaning, and should be enameled so as to protect the wort and the beer against the injurious influence of contact with metal. The cover has a stuffing box 7 and a bracket 8 in which is journaled the vertical shaft 9 driven by bevel gearing 10 and carrying at its lower end the spindle 11 provided with the stirrer 12; the latter as shown consists of four blades or wings inclined relatively to the axis of rotation. At the bottom of the vessel 5 is located a supply pipe 13, and the vessel 5 is further surrounded by a jacket 14 through which a heating medium or a cooling medium may be circulated. The supply pipe 13 is connected with the surrounding air through the medium of air filter 15 of any suitable construction (a box filled with cotton batting will do), the connection being controlled by a valve 16. The pipe, 13, also has another connection, controlled by a valve 17 and leading to a vessel 18 adapted to contain the yeast used for producing fermentation. The air or the yeast may be conveyed through the supply pipe 13 either by pressure, or by suction, as by means of a vacuum pump 19 connected with the upper part of the vessel 5 or with the cover 6 thereof.

Apparently, so far as my present researches have gone, the amount of air necessary for permitting proper fermentation need not be more than that which the yeast takes up upon suitable exposure to the atmosphere.

The presence of air in the finished beer, even in relatively small quantities, may have, and often does have, a deleterious effect upon the beer, such effect becoming more pronounced the longer the beer is stored in the barrel.

The carbonic acid gas will be dissolved in greater quantity than the oxygen.

Based upon the above facts I have developed a process for brewing beer as free as possible from air, so that not only the finished beer contains substantially no air in solution, but air is excluded, as much as possible, during the fermentation process itself, only so much air being admitted as is necessary to permit the yeast cells to grow, and to convert a suitable amount of sugar into alcohol and carbon dioxid. Incidentally I thus control, to a large degree, the extent of growth of the yeast, and prevent excessive yeast generation, so as not to deprive the beer of an excessive quantity of useful constituents. Instead of limiting my growth of yeast to about three or four times its original amount, as described in my above mentioned Letters Patent, I find that I may reduce the growth of yeast to about twice its original amount and thus obtain a better product.

The process which I have devised is applicable to every process of brewing beer, but is of especial value in the rapid process of brewing beer which is more particularly set forth in the above mentioned Letters Patent, and also in Letters Patent to myself and Hans Bolze, No. 899,756, September 29, 1908. In these patents I have described, generally speaking, a process which involves the stirring of the fermenting wort, in order to expedite the growth of yeast, such stirring being preferably done by means of a current of carbonic acid gas.

The hot wort contains practically no air, that is to say, no free oxygen. When the wort is allowed to cool it absorbs air, which is partly taken up into solution, and the oxygen of which is partly chemically combined with the wort. It is necessary to permit some air to enter the wort as the chemical combination of oxygen with wort is necessary in order to produce the proper flavor. This chemical combination can, however, not be effected without at the same time introducing surplus air into solution, which air should be removed as far as possible from the wort before the yeast begins to be active therein.

By removing the air in solution from the wort, and then adding just enough air to permit the yeast to grow to the desired extent, I obtain a finished beer substantially free from dissolved air. I may remove the air from the wort by the following methods:

(1) The hot wort is run into a sterilized vessel and allowed to cool therein as described in my Patent No. 915,791. Instead of waiting until the temperature has fallen to about 50° C., as described in such patent, and then shutting off the air supply and introducing carbonic acid gas to take care of the partial vacuum, I shut off such air supply and commence the introduction of carbonic acid gas long before the temperature has fallen to that degree, and as nearly as possible at a time when enough air has been absorbed to produce the requisite amount oxygen compounds, required for the proper flavor of the finished beer. For example, I may stop when the temperature has fallen to about 75° C., that is to say, at a time when a great deal less air has been absorbed by the cooling wort than is absorbed in the process described in said Letters Patent. This step is not essential to my process as I may remove excess of air by the carbonic acid gas treatment, hereinafter to be described, but is of advantage inasmuch as it makes it unnecessary to carry on such carbonic acid gas treatment for any great length of time.

When the wort has been cooled I may pass carbonic acid gas through the same, such carbonic acid gas, upon the principle above described, being absorbed by the wort, and simultaneously causing the air held in solution to leave the wort.

(2) While the above is my preferred method, I may also remove the air in solution by placing the wort in the fermenting tank and placing yeast in the bottom of such tank. The carbonic acid gas produced by the fermentation of the yeast will rise in the wort and be partly dissolved thereby, in greater quantity than the oxygen wort in solution. In carrying out this specific process it may be necessary to use suitable means to keep the yeast in the lower part of the fermenting tank, for instance by cooling the lower part of the fermenting vessel. In considering this specific process the wort must be considered as divided into two portions, the lower portion in which fermentation is actually taking place, and the upper portion in which no fermentation as yet takes place, but which is subjected to a de-aeration process by means of the gas escaping from the first portion. This second portion, of course, eventually must be considered as being incorporated in the first portion when the fermentation becomes general throughout the mass of wort in the tank.

In practice I combine methods (1) and (2), employing the latter to assist in removing such free oxygen as has not been removed by the former.

After the wort has been de-aerated, as above described, the yeast may be introduced so that the fermentation process may begin. Preferably, as already stated, the yeast has already been aerated so as to have taken up a sufficient amount of air to enable it to grow to the desired extent. Of course, the air and the yeast may be introduced into the wort separately.

In my earlier patents I have described a process for bringing about rapid fermentation, which process may be carried on by a stirring of the wort, preferably by means of a current of carbonic acid gas, the use of such gas as a stirring means having the particular advantage that it carries away the immature bouquets formed during fermentation, without giving a flat taste to the beer. If this process is employed in carrying out my present process, I take care to use carbonic acid gas only after the same has been freed, as far as possible from air, or free oxygen, so as not to introduce quantities of air into the fermenting wort any more than absolutely necessary. Whether or not it is desired to carry on such older process in connection with my present process, it is of advantage in my present process to pass a current of carbonic acid gas through the fermenting wort in order to remove, as far as possible, any air which may still be left in solution in the wort. It is obvious that if, during the fermentation process, a stream of carbonic acid gas is introduced into the wort from the outside of the tank, less care will have to be used in the removal of air from the wort before the fermentation process begins. In fact, it is possible in many cases that time may be saved by not removing the air as thoroughly as possible before the commencement of fermentation, but to remove the air during the process of fermentation. Thus my process has particular value when combined with the process disclosed in my former patents. Of course, such added carbonic acid gas is in part absorbed by the wort and remains in the finished beer.

The carbonic acid gas which is passed through the wort should, of course, as already stated, be as free from air as possible. If the carbonic acid gas resulting from the fermentation is used for this purpose it is necessary to remove not only the air, but the essential oils, esters, etc., which form the immature bouquets created by the fermentation. It is obviously advisable to collect the carbonic acid gas which has passed through the wort and to purify the same so that it may be used over again in the process. When the gas is gathered from the top of the fermenting wort, it will be found to consist of a mixture of some of the carbonic acid gas created by fermentation and some of the carbonic acid gas which has been introduced into the wort from the outside of the tank, and this mixture will contain some air and some of the immature bouquets. In order that this carbonic acid gas may be used over again, I remove the oxygen from the same by one of the following methods:

(a) I pass the gas through a glowing contact substance such as platinum sponge or palladium asbestos and burn up the oxygen by blowing in hydrogen, thus forming water.

(b) The gas can be passed through iron sulfate $FeSO_4$ which removes the oxygen.

(c) The gas may be passed over glowing copper shavings.

(d) The spent yeast taken from the fermenting tank is removed to another vessel under exclusion of air, and the gas is passed, in as finely divided a state as possible, through the yeast. It will be found that the amount of spent yeast obtained in this process is usually quite sufficient to absorb the amount of oxygen to a degree and amount suitable for this process.

Any other suitable method may, of course, be used for this purpose. The immature bouquets should also be removed by suitable means. This may be done by various methods already known, or by a method devised by me which forms the subject matter of a separate application. I have found, also, that these immature bouquets are removed by passing the gas over glowing copper shavings, so that when process (c) is used, both the oxygen and the immature bouquets may simultaneously be removed. Some of the immature bouquets are also removed simultaneously with the oxygen when spent yeast is used according to the above described method (d).

It may be found very difficult to remove absolutely all the oxygen from the carbonic acid gas by any of the above mentioned methods, but it is of course obvious that the more the carbonic acid gas is free from air or oxygen, the more nearly the perfect conditions contemplated by my process are obtained.

Care should, of course, be taken that during the process of removing air from carbonic acid gas no air should accidentally be re-introduced. In other words, the various receptacles, cleaning apparatus, pipes, pumps, etc., should be absolutely air tight. It is of advantage not to permit the gas to come into contact with the water seal in the gasometer, but to cover such seal with a suitable liquid such as paraffin oil or vaseline.

It is also advisable not to collect the gas from the upper surface of the wort at the beginning of the process, but to permit such gas to blow off into the atmosphere until the air in the upper portion of the fermenting tank has had an opportunity to escape. Suitable indicating devices may be applied to the top of the closed fermentation tank, which enable the brew master to ascertain when a substantial quantity of air no longer passes off with the gas. It is advisable also to provide suitable air indicating devices at various parts of the purifying and storing apparatus, so that any leakage may be immediately discovered and checked.

By the process above described a beer is produced substantially free from dissolved air (oxygen). It is, however, commercially impracticable to produce carbonic acid gas absolutely free from air so that even though the process be carried on under conditions as commercially perfect as may be, a small quantity of air may still be found in the beer. This small quantity may be removed in the following manner:

The beer, preferably while still in the fermenting tank, is subjected to an additional pressure, preferably of carbonic acid gas, and is kept under such pressure for a short time to permit yeast to settle. The pressure may for instance be increased to 1.6 atmosphere or even higher as against a usual pressure of 1.4 atmospheres. The pressure is then removed gradually by permitting the gas to blow off, and the yeast then rises in the beer. The yeast absorbs the free oxygen remaining in the beer and thereafter gradually settles to the bottom, so that the beer itself is free from free oxygen.

It is, of course, to be understood that my process may be varied within certain limits by those skilled in the art and that the same may be carried on in a less perfect manner and still embody my invention as outlined in the appended claims.

When I speak in my claims of "cooled wort" I mean a wort in which the fermentation has not been completed.

I claim:

1. In the art of brewing beer, the improvement which consists in substantially complete removal of free oxygen from the cooled wort.

2. In the art of brewing beer, the improvement which consists in substantially complete removal of free oxygen from the cooled wort by means of substantially pure carbonic acid gas.

3. In the art of brewing beer, the improvement which consists in substantially complete removal of free oxygen from the cooled wort by introducing into the fermenting vessel carbonic acid gas, collecting the escaping fermentation gases and re-introducing the same into the wort while the fermentation is still going on.

4. In the art of brewing beer, the improvement which consists in substantially complete removal of free oxygen from the cooled wort by passing through the same carbonic acid gas as free as possible from air, then re-introducing the said carbonic acid gas, suitably purified, into the wort while the fermentation is still going on.

5. The art of brewing beer which comprises the substantially complete removal of the free oxygen from the cool wort before fermentation has begun in such wort, and then fermenting the wort substantially as described.

6. In the art of brewing beer, the improvement which consists in substantially complete removal of free oxygen from the cooled wort, before fermentation is begun and then fermenting the wort by means of aerated yeast.

7. In the art of brewing beer, the improvement which consists in substantially complete removal of free oxygen from the cooled wort, before fermentation is begun and then fermenting the wort by means of aerated yeast and then removing any remaining free oxygen from the finished beer.

8. In the art of brewing beer, the improvement which consists in substantially complete removal of free oxygen from the cooled wort, before fermentation is begun, and then fermenting the wort by means of aerated yeast, and then removing any remaining free oxygen from the finished beer by subjecting the beer in the presence of yeast to suitable added pressure of a suitable gas, and then gradually releasing such pressure.

9. In the art of brewing beer, the improvement which consists in substantially complete removal of free oxygen from the cooled wort, fermenting the wort by means of aerated yeast, and then removing any remaining free oxygen from the finished beer by subjecting the beer in the presence of yeast to a suitable pressure of a suitable gas, and gradually removing such pressure.

10. In the art of brewing beer, the improvement which consists in substantially complete removal of free oxygen from the cooled wort, then fermenting said wort by means of aerated yeast and simultaneously passing through the wort a current of carbonic acid gas, as free as possible from free oxygen.

11. In the art of brewing beer, the improvement which consists in substantially complete removal of free oxygen from the cooled wort, then fermenting said wort by means of aerated yeast and simultaneously passing a current of carbonic acid gas, as free as possible from free oxygen, through the wort, collecting the carbonic acid gas from the surface of the wort, and then reintroducing the said carbonic acid gas suitably purified into the wort, while the fermentation is still going on.

12. In the art of brewing beer, the improvement which consists in fermenting the wort and then passing through such wort, during a suitable length of time, a current of carbonic acid gas from which oxygen has been removed, as much as possible, so that carbonic acid gas enters the wort, and at the same time carbonic acid gas, mixed with the raw bouquets and air which it has taken up from the liquid, leaves the wort whereby the substantially complete removal of the free air in the wort is accomplished.

13. In the art of brewing beer, the improvement which consists in substantially complete removal of air from the finished beer by subjecting such beer in the presence of yeast to a suitable pressure of a suitable gas, and gradually removing such pressure.

In testimony whereof I have hereunto set my hand in the presence of two subscribing witnesses.

LEOPOLD NATHAN.

Witnesses:
LOUIS ALEXANDER,
JOHN A. FERGUSON.